United States Patent
Li et al.

(10) Patent No.: US 10,785,665 B2
(45) Date of Patent: Sep. 22, 2020

(54) COMMUNICATION METHOD, COMMUNICATION DEVICE AND TERMINAL

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yun-Fei Zhang, Shenzhen (CN)

(73) Assignee: YULONG COMPUTER TELECOMMUNICATIONS SCIENTIFIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/331,614

(22) PCT Filed: Dec. 28, 2016

(86) PCT No.: PCT/CN2016/112757
§ 371 (c)(1),
(2) Date: Mar. 8, 2019

(87) PCT Pub. No.: WO2018/045679
PCT Pub. Date: Mar. 15, 2018

(65) Prior Publication Data
US 2019/0387420 A1 Dec. 19, 2019

(30) Foreign Application Priority Data
Sep. 9, 2016 (CN) .......................... 2016 1 0814341

(51) Int. Cl.
*H04W 24/04* (2009.01)
*H04W 76/19* (2018.01)
*H04W 76/18* (2018.01)

(52) U.S. Cl.
CPC .......... *H04W 24/04* (2013.01); *H04W 76/18* (2018.02); *H04W 76/19* (2018.02)

(58) Field of Classification Search
CPC ...... H04W 24/04; H04W 76/19; H04W 76/18
See application file for complete search history.

(56) References Cited

U.S. PATENT DOCUMENTS

2012/0213096 A1* 8/2012 Krishnamurthy ... H04L 27/3863
370/252
2013/0114484 A1* 5/2013 Suzuki ............... H04W 68/025
370/311
(Continued)

FOREIGN PATENT DOCUMENTS

| CN | 104540158 A | 4/2015 |
|---|---|---|
| CN | 104768160 A | 7/2015 |

(Continued)

*Primary Examiner* — Jael M Ulysse
(74) *Attorney, Agent, or Firm* — ScienBiziP, P.C.

(57) ABSTRACT

The present disclosure provides a communication method, communication device and a terminal, the communication method comprising: determining a PCell group or a PSCell group working on the unlicensed carrier by a terminal; and performing a RLM on the PCell group or the PSCell group; the PCell group or the PSCell group being established by selected from at least one serving cell working on the unlicensed carrier, each serving cell working on one unlicensed carrier. The technical solution can deploy a PCell group or a PSCell group in the unlicensed frequency band, to perform RLM on the PCell group or the PSCell group, a number of times of RLF is reduced, and it can avoided a problem of huge signaling overhead and throughput loss, caused by RRC Reestablishment or reconfiguration of the PSCell as RLF has been frequently detected in the unlicensed frequency band.

16 Claims, 7 Drawing Sheets

(56) References Cited

U.S. PATENT DOCUMENTS

| | | | |
|---|---|---|---|
| 2013/0315157 A1* | 11/2013 | Krishnamurthy | H04L 5/0048 370/329 |
| 2014/0126403 A1* | 5/2014 | Siomina | H04J 11/005 370/252 |
| 2014/0269336 A1 | 9/2014 | Lee et al. | |
| 2015/0249972 A1* | 9/2015 | You | H04L 5/0035 370/254 |
| 2015/0271744 A1* | 9/2015 | Liu | H04L 5/005 370/329 |
| 2015/0312784 A1* | 10/2015 | You | H04L 1/0693 370/252 |
| 2016/0135143 A1* | 5/2016 | Won | H04W 4/06 370/312 |
| 2016/0227571 A1* | 8/2016 | Baek | H04W 48/20 |
| 2016/0262118 A1* | 9/2016 | Kim | H04W 52/365 |
| 2016/0295520 A1* | 10/2016 | Dinan | H04W 52/146 |
| 2016/0302230 A1* | 10/2016 | Novlan | H04W 40/244 |
| 2016/0338118 A1* | 11/2016 | Vajapeyam | H04L 69/323 |
| 2017/0048824 A1* | 2/2017 | Yerramalli | H04W 24/10 |

FOREIGN PATENT DOCUMENTS

| | | |
|---|---|---|
| CN | 105103586 A | 11/2015 |
| CN | 106255122 A | 12/2016 |
| CN | 106255123 A | 12/2016 |
| CN | 106255124 A | 12/2016 |

* cited by examiner

COMMUNICATION METHOD, COMMUNICATION DEVICE AND TERMINAL

CROSS-REFERENCE TO RELATED APPLICATIONS

The application claims priority of Chinese Patent Application No. 201610814341.1, entitled "Communication Method, Communication Device and Terminal," filed on Sep. 9, 2016 in the China National Intellectual Property Administration (CNIPA), the entire contents of which are incorporated by reference herein.

FIELD

The embodiments of the present disclosure relates to technical fields of communications, specifically a communication method, a communication device and a terminal.

BACKGROUND

With the sharp increases of communication traffic, the 3rd Generation Partnership Project (3GPP) is becoming insufficient to meet the demands of high network capacity. Therefore, the 3GPP provides a concept of Long Term Evolution (LTE) Assisted Access (LAA), which uses unlicensed frequency spectrum to assist the LTE licensed frequency spectrum. In an LAA scheme, an LTE system is deployed in an unlicensed frequency band based on functions of carrier aggregation.

Meanwhile, the unlicensed frequency spectrum can have two working modes, one of which is a Supplemental Downlink (SDL) mode, that is, merely including downlink transmission sub-frames; and the other one is a Time Division Duplexing (TDD) mode, including downlink sub-frames and uplink sub-frames. The SDL can only be used by means of a carrier aggregation technology. The TDD mode can be used by means of a Dual Connectivity (DC) in addition to the carrier aggregation technology, and can also be independently used.

Current schemes address various problems when an unlicensed frequency spectrum and an LTE licensed frequency spectrum are working by using a carrier aggregation mode, and issues when a DC mode is applied has not been addressed. In many cases, a connection between a base station deployed by the unlicensed frequency spectrum and a base station where the licensed frequency spectrum is deployed is not ideal, sine only a DC mode of connection can be used. In the case of DC, a secondary Evolved Node B (SeNB) needs a primary secondary cell (PSCell) to provide partial functions of a primary cell (PCell), such as Radio Link Monitoring (RLM) of PSCell.

In general, when detected times of Signal to Interference plus Noise Ratio (SINR) of the PSCell are lower than Qout reach N310, a clock T310 is started. When detected times of the SINR of the PSCell are higher than Qin reach N311 before the clock T310 is turned off, it is indicated that a link is recovered, otherwise, it is determined to be Radio Link Failure (RLF). When the PSCell RLF is detected, user equipment needs to notify the PCell. A value of the SINR is an average value of a plurality of sampling values in a sliding window 200 ms, and a sampling frequency is 10 ms.

In addition, PCell working on unlicensed carriers can also be deployed in unlicensed frequency spectrums, wherein cells in the unlicensed frequency spectrum works independently (i.e., standalone), to implement control of communications.

However, as it is required to use a Listening Before Talk (LBT) mechanism to occupy an unlicensed frequency spectrum. If a channel is occupied by other devices, quality of the SINR may be poor. A method to define the RLM strategy in an unlicensed frequency spectrum is eagerly sought within the art.

SUMMARY

The present disclosure provides a new communication scheme based on at least one of the above-described technical problems, a primary cell (PCell) group or a primary secondary cell (PSCell) group can be deployed in the unlicensed frequency band, to perform Radio Link Monitoring (RLM) on the PCell group or the PSCell group, a number of times of Radio Link Failure (RLF) is reduced, and it can avoided a problem of huge signaling overhead and throughput loss, caused by an Radio Resource Control (RRC) Reestablishment or reconfiguration of the PSCell as RLF has been frequently detected in the unlicensed frequency band.

In view of the above, according to a first aspect of the present disclosure, a communication method is provided, and includes: determining a PCell group or a PSCell group working on the unlicensed carrier by a terminal; and performing a RLM on the PCell group or the PSCell group; the PCell group or the PSCell group being established by selected from at least one serving cell working on the unlicensed carrier, each serving cell working on one unlicensed carrier.

In the technical solution, when at least one serving cells that are working in the unlicensed frequency band is selected to constitute the PCell, this is a communication scene that the PCell is deployed in the unlicensed frequency band and the PCell is working in the unlicensed frequency band independently. As a channel cannot be continuously occupied in the unlicensed frequency band, that is a channel detection mechanism is existed, therefore, a number of times of RLF can be reduced by performing the RLM on the PCell group, and then it can avoided a problem of huge signaling overhead and throughput loss, caused by RRC Reestablishment as RLF has been frequently detected in the unlicensed frequency band. The PCell group working on the unlicensed carrier can be determined by receiving notification signaling sent by a primary serving cell of a primary base station in an unlicensed frequency band.

When at least one serving cells that are working in the unlicensed frequency band is selected to constitute the PSCell, this is a communication scene that a Dual Connectivity (DC) is executed in an unlicensed frequency band and a licensed frequency band. As a channel cannot be continuously occupied in the unlicensed frequency band, that is a channel detection mechanism is existed, therefore, a number of times of RLF can be reduced by performing the RLM on the PSCell group, and then it can avoided a problem of huge signaling overhead and throughput loss, caused by reconfiguration of the PSCell as RLF has been frequently detected in the unlicensed frequency band. The PSCell group working on the unlicensed carrier can be determined by receiving notification signaling sent by a primary serving cell of a primary base station in an licensed frequency band or the PSCell of a secondary base station in an unlicensed frequency band.

Regarding how to configure the at least one serving cell and how to select and constitute the PCell group or the PSCell group of each terminal, the present disclosure provides following three schemes:

Scheme One:

The PSCell group is established by selecting from at least one serving cell by the primary serving cell of the primary base station working in licensed frequency band, the at least one serving cell is configured by the primary serving cell for the terminal on the secondary base station.

The scheme one is applicable to a communication scene that the unlicensed frequency band and the licensed frequency band are communicated in a DC mode, namely, the primary serving cell of the primary base station working in a licensed frequency band configures the at least one serving cell for each terminal on a secondary Evolved Node B (SeNB), and the primary serving cell selects and constitutes the PSCell group of each terminal on the SeNB.

Scheme Two:

The PSCell group is established by selecting from at least one serving cell by a primary secondary serving cell working in unlicensed frequency band, the primary secondary serving cell is configured by the primary serving cell of the primary base station working in a licensed frequency band for the terminal on the SeNB. The primary secondary serving cell configures zero or at least one cell working in the unlicensed frequency band for the terminal on the SeNB, the zero or at least one cell and the primary secondary serving cell constitute the at least one serving cell.

The scheme two is also applicable to a communication scene that the unlicensed frequency band and the licensed frequency band are communicated in the DC mode, namely, the primary serving cell of the primary base station working in an licensed frequency band configures the primary secondary serving cell for each terminal on the SeNB, and the primary secondary serving cell configures zero or at least one cell working in the unlicensed frequency band for each terminal on the SeNB, the zero or at least one cell and the primary secondary serving cell constitute the at least one serving cell, and the primary secondary serving cell selects and constitutes the PSCell group of each terminal on the SeNB.

Moreover, under the condition that there are a plurality of primary secondary serving cells, configuration signaling for configuring the zero or at least one cell for each terminal is sent by one or more of the primary secondary serving cells. The configuration signaling can be Radio Resource Control (RRC) signaling.

Scheme Three:

The PCell group is established by selecting from at least one serving cell by the primary serving cell of the primary base station working in a unlicensed frequency band, the primary serving cell configures zero or at least one cell working in the unlicensed frequency band for the terminal on the primary base station, the zero or at least one cell and the primary serving cell constitute the at least one serving cell.

The scheme three is applicable to a communication scene that the unlicensed frequency band works independently, and the PCell is deployed in the unlicensed frequency band, namely, the primary serving cell of the primary base station working in an unlicensed frequency band configures zero or at least one cell working in the unlicensed frequency band for each terminal on the primary base station, the zero or at least one cell and the primary serving cell constitute the at least one serving cell, and the primary serving cell selects and constitutes the PCell group of each terminal.

In any of the technical solutions described above, optionally, performing the RLM on the PCell group or the PSCell group specifically includes: when a cell in the PCell group or the PSCell group is performing a downlink transmission, determining a sampling value of an SINR of a cell performing the downlink transmission by taking 5 ms or 10 ms as a sampling period, the downlink transmission comprising sending a downlink reference signal and/or downlink data and/or downlink control signaling; and determining a radio link state of the PCell group or the PSCell group according to the sampling value of the SINR.

In the technical solution, the sampling value of the SINR is only performed within a duration of downlink transmission, optionally, in order to have more sampling values in a sliding window for SINR averaging, a smaller sampling period (e.g., 5 ms) can be used to sample.

According to the sampling value of the SINR, implementation of the step of determining the radio link state of the PCell group or the PSCell group, the present disclosure provides the following several modes:

Mode One:

Calculating an average value of the sampling values of the SINR obtained on all cells in the PCell group or the PSCell group within a sliding window time period of a predetermined length, and determining the radio link state of the PCell group or the PSCell group based on the average value of the maximum values.

In this mode, the sampling values of the SINR detected on all cells in the PCell group or the PSCell group can be averaged together, to determine the radio link state of the PCell group or the PSCell group.

Moreover, when it is determined that a radio link of the PSCell group fails, sending a radio link failure report to the primary serving cell of the primary base station working in the licensed frequency band; when it is determined that a radio link of the PCell group fails, performing an RRC-reestablishment process.

Mode Two:

At each sampling time, selecting a maximum value of the sampling values of the SINR detected by the PCell group or the PSCell group, calculating an average value of the maximum values within the sliding window time period, and determining the radio link state of the PCell group or the PSCell group based on the average value of the maximum values.

In this mode two, at each sampling time, the maximum value of the sampling value of the SINR can reflect the radio link state of the PCell group or the PSCell group in the whole, thus the maximum value of the plurality of sampling values of SINR selected in the plurality of sampling time can be averaged, to determine the radio link state of the PCell group or the PSCell group.

Moreover, when it is determined that the radio link state of the PSCell group is determined to be failed, sending a radio link failure report to a primary serving cell of the primary base station working in the licensed frequency band; when it is determined that the radio link of the PCell group fails, performing an RRC-reestablishment process.

Mode Three:

Calculating an average value of the SINR sampling values of each cell in the PCell group or the PSCell group within the sliding window period of the predetermined length, to determine the radio link state of each cell respectively.

In this mode three, the SINR sampling values for each cell may be averaged separately, to determine the radio link state of each cell respectively, and further determining a radio link state of a whole PCell group or PSCell group according to the radio link state of each cell.

In addition, performing the RLM on the PCell group or PSCell group can also have the following modes:

Mode Four:

Detecting a channel occupancy rate of each cell in the PCell group or PSCell group; and when the channel occupancy rate of any cell in the PCell group or PSCell group is greater than a set threshold value, determining that the radio link of the any cell failed.

In the mode four, the radio link state of each cell can be determined according to the channel occupancy rate of each cell, and further determining a radio link state of the whole PCell group or PSCell group according to the radio link state of each cell.

Mode Five:

Detecting Received Signal Strength Indication (RSSI) of each cell in the PCell group or the PSCell group; and when the RSSI of any cell in the PCell group or the PSCell group detected is higher than a threshold value within a continuous preset duration, determining that the radio link of the any cell failed, the threshold value beings used for determining whether the channel is idle.

In the mode five, the radio link state of each cell can be determined according to the RSSI of each cell, and further the radio link state of the whole PCell group or the PSCell group can be determined according to the radio link state of each cell.

Based on the technical solution of the mode three, the mode four and the mode five, the communication method further includes:

When the radio link states of all cells in the PSCell group are determined to be failed, sending a radio link failure report to the primary serving cell of the primary base station working in an licensed frequency band;

When the radio link state of any cell in the PSCell group is determined to be failed, sending a corresponding notification message to the primary serving cell of the primary base station working in an licensed frequency band or the other PSCells in the PSCell group;

When the radio link states of all cells in the PCell group are determined to be failed, performing an RRC-reestablishment process;

When the radio link state of any cell in the PCell group is determined to be failed, sending the corresponding notification message to the other PCells in the PCell group.

According to a second aspect of the present disclosure, a communication device is provided, and includes: a first determination unit, configured to determine a PCell group or a PSCell group working on the unlicensed carrier, the PCell group or the PSCell group being established by selected from at least one serving cell working on the unlicensed carrier, each serving cell working on one unlicensed carrier, and a processing unit, configured to perform a RLM on the PCell group or the PSCell group.

In the technical solution, when at least one serving cells that are working in the unlicensed frequency band is selected to constitute the PCell, this is a communication scene that the PCell is deployed in the unlicensed frequency band and the PCell is working in the unlicensed frequency band independently. As a channel cannot be continuously occupied in the unlicensed frequency band, that is a channel detection mechanism is existed, therefore, a number of times of RLF can be reduced by performing the RLM on the PCell group, and then it can avoided a problem of huge signaling overhead and throughput loss, caused by RRC Reestablishment as RLF has been frequently detected in the unlicensed frequency band. The PCell group working on the unlicensed carrier can be determined by receiving notification signaling sent by a primary serving cell of a primary base station in an unlicensed frequency band.

when at least one serving cells that are working in the unlicensed frequency band is selected to constitute the PSCell, this is a communication scene that a Dual Connectivity (DC) is executed in an unlicensed frequency band and a licensed frequency band. As a channel cannot be continuously occupied in the unlicensed frequency band, that is a channel detection mechanism is existed, therefore, a number of times of RLF can be reduced by performing the RLM on the PSCell group, and then it can avoided a problem of huge signaling overhead and throughput loss, caused by reconfiguration of the PSCell as RLF has been frequently detected in the unlicensed frequency band. The PSCell group working on the unlicensed carrier can be determined by receiving notification signaling sent by a primary serving cell of a primary base station in an licensed frequency band or the PSCell of a secondary base station in an unlicensed frequency band.

Regarding how to configure the at least one serving cell and how to select and constitute the PCell group or the PSCell group of each terminal, the present disclosure provides following three schemes:

Scheme One:

The PSCell group is established by selecting from at least one serving cell by the primary serving cell of the primary base station working in licensed frequency band, the at least one serving cell is configured by the primary serving cell for the terminal on the secondary base station.

The scheme one is applicable to a communication scene that the unlicensed frequency band and the licensed frequency band are communicated in a DC mode, namely, the primary serving cell of the primary base station working in a licensed frequency band configures the at least one serving cell for each terminal on a secondary Evolved Node B (SeNB), and the primary serving cell selects and constitutes the PSCell group of each terminal on the SeNB.

Scheme Two:

The PSCell group is established by selecting from at least one serving cell by a primary secondary serving cell working in unlicensed frequency band, the primary secondary serving cell is configured by the primary serving cell of the primary base station working in a licensed frequency band for the terminal on the SeNB. The primary secondary serving cell configures zero or at least one cell working in the unlicensed frequency band for the terminal on the SeNB, the zero or at least one cell and the primary secondary serving cell constitute the at least one serving cell.

The scheme two is also applicable to a communication scene that the unlicensed frequency band and the licensed frequency band are communicated in the DC mode, namely, the primary serving cell of the primary base station working in an licensed frequency band configures the primary secondary serving cell for each terminal on the SeNB, and the primary secondary serving cell configures zero or at least one cell working in the unlicensed frequency band for each terminal on the SeNB, the zero or at least one cell and the primary secondary serving cell constitute the at least one serving cell, and the primary secondary serving cell selects and constitutes the PSCell group of each terminal on the SeNB.

Moreover, under the condition that there are a plurality of primary secondary serving cells, configuration signaling for configuring the zero or at least one cell for each terminal is sent by one or more of the primary secondary serving cells. The configuration signaling can be Radio Resource Control (RRC) signaling.

Scheme Three:

The PCell group is established by selecting from at least one serving cell by the primary serving cell of the primary base station working in a unlicensed frequency band, the primary serving cell configures zero or at least one cell working in the unlicensed frequency band for the terminal on the primary base station, the zero or at least one cell and the primary serving cell constitute the at least one serving cell.

The scheme three is applicable to a communication scene that the unlicensed frequency band works independently, and the PCell is deployed in the unlicensed frequency band, namely, the primary serving cell of the primary base station working in an unlicensed frequency band configures zero or at least one cell working in the unlicensed frequency band for each terminal on the primary base station, the zero or at least one cell and the primary serving cell constitute the at least one serving cell, and the primary serving cell selects and constitutes the PCell group of each terminal.

In any of the technical solutions described above, optionally, the processing unit includes: a first detection unit, configured to determine a sampling value of an SINR of a cell performing the downlink transmission by taking 5 ms or 10 ms as a sampling period, when a cell in the PCell group or the PSCell group is performing a downlink transmission, the downlink transmission comprising sending a downlink reference signal and/or downlink data and/or downlink control signaling; a second determination unit, configured to determine a radio link state of the PCell group or the PSCell group according to the sampling value of the SINR.

In the technical solution, the sampling value of the SINR is only performed within a duration of downlink transmission, optionally, in order to have more sampling values in a sliding window for SINR averaging, a smaller sampling period (e.g., 5 ms) can be used to sample.

The mode that the second determination unit determines the radio link state of the PCell group or the PSCell group according to the sampling value of the SINK includes the following several modes:

Mode One:

The second determination unit is specially configured to:

Calculate an average value of the sampling values of the SINR obtained on all cells in the PCell group or the PSCell group within a sliding window time period of a predetermined length, and determine the radio link state of the PCell group or the PSCell group based on the average value of the maximum values.

In this mode, the sampling values of the SINR detected on all cells in the PCell group or the PSCell group can be averaged together, to determine the radio link state of the PCell group or the PSCell group.

Mode Two:

The second determination unit is specially configured to:

At each sampling time, select a maximum value of the sampling values of the SINR detected by the PCell group or the PSCell group, calculate an average value of the maximum values within the sliding window time period, and determine the radio link state of the PCell group or the PSCell group based on the average value of the maximum values.

In this mode, at each sampling time, the maximum value of the sampling value of the SINR can reflect the radio link state of the PCell group or the PSCell group in the whole, thus the maximum value of the plurality of sampling values of SINR selected in the plurality of sampling time can be averaged, to determine the radio link state of the PCell group or the PSCell group.

Based on technical solution of mode one and mode two, the communication device further includes: a first sending unit, configured to send a radio link failure report to a primary serving cell of the primary base station working in the licensed frequency band, when the second determination unit determines that the radio link state of the PSCell group is determined to be failed; a first perform unit, configured to perform an RRC-reestablishment process, when the second determination unit determines that the radio link state of the PSCell group is determined to be failed.

Mode Three:

The second determination unit is specially configured to:

Calculate an average value of the SINR sampling values of each cell in the PCell group or the PSCell group within the sliding window period of the predetermined length, to determine the radio link state of each cell respectively.

In this mode, the SINR sampling values for each cell may be averaged separately, to determine the radio link state of each cell respectively, and further determining a radio link state of a whole PCell group or PSCell group according to the radio link state of each cell.

In addition, the processing unit performing the RLM on the PCell group or PSCell group can also have the following modes:

Mode Four:

The processing unit includes: a second detection unit, configured to detect a channel occupancy rate of each cell in the PCell group or PSCell group; a third determination unit, configured to determine that the radio link of the any cell failed, when the second detection unit detects that the channel occupancy rate of any cell in the PCell group or PSCell group is greater than a set threshold value.

In the mode four, the radio link state of each cell can be determined according to the channel occupancy rate of each cell, and further determining a radio link state of the whole PCell group or PSCell group according to the radio link state of each cell.

Mode Five:

The processing unit includes: a third detection unit, configured to detect Received Signal Strength Indication (RSSI) of each cell in the PCell group or the PSCell group; a fourth determination unit, configured to determine that the radio link of the any cell failed, when the third detection unit detects that the RSSI of any cell in the PCell group or the PSCell group is higher than a threshold value within a continuous preset duration, the threshold value beings used for determining whether the channel is idle.

In the mode five, the radio link state of each cell can be determined according to the RSSI of each cell, and further the radio link state of the whole PCell group or the PSCell group can be determined according to the radio link state of each cell.

Based on the technical solution of the mode three, the mode four and the mode five, the communication device further includes:

A second sending unit, configured to send a radio link failure report to the primary serving cell of the primary base station working in an licensed frequency band, when the radio link states of all cells in the PSCell group are determined to be failed, and configured to send a corresponding notification message to the primary serving cell of the primary base station working in an licensed frequency band or the other PSCells in the PSCell group, when the radio link state of any cell in the PSCell group is determined to be failed;

A second perform unit, configured to perform an RRC-reestablishment process, when the radio link states of all cells in the PCell group are determined to be failed;

A third sending unit, configured to send the corresponding notification message to the other PCells in the PCell group, when the radio link state of any cell in the PCell group is determined to be failed.

According to a third aspect of the present disclosure, a terminal is provided, includes: communication device according to any of the above technical solutions.

Through the above technical solutions, the PCell group or the PSCell group can be deployed in the unlicensed frequency band, to perform RLM on the PCell group or the PSCell group, a number of times of RLF is reduced, and it can avoided a problem of huge signaling overhead and throughput loss, caused by RRC Reestablishment or reconfiguration of the PSCell as RLF has been frequently detected in the unlicensed frequency band.

DETAILED DESCRIPTION

The present disclosure will be further described in detail below with reference to the drawings and specific embodiments. It should be noted that the embodiments in the present disclosure and the features in the embodiments may be combined with each other without conflict.

In the following description, numerous specific details are set forth in order to provide a full understanding of the invention, but the disclosure may be practiced otherwise than limitations of the embodiments as described herein.

Figure 1:
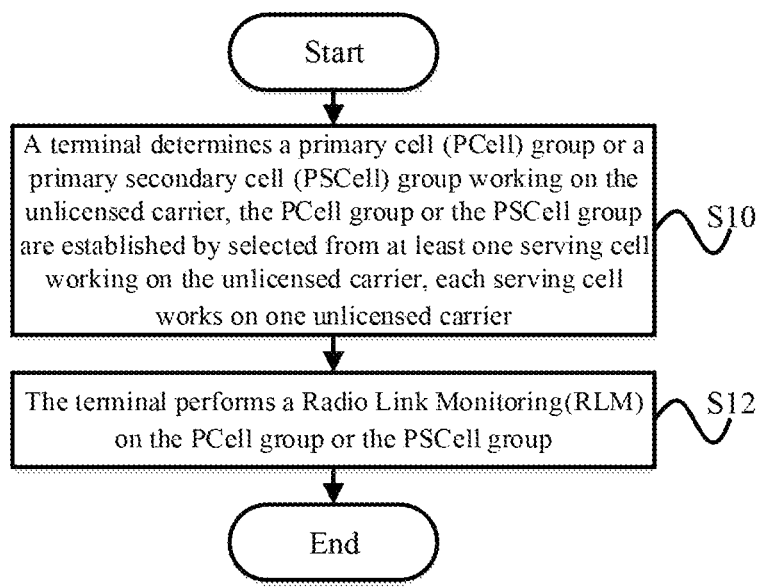
FIG. 1 is a flow chart of a communication method according to an embodiment of the present disclosure.

FIG. 1 is a flow chart of a communication method according to an embodiment of the present disclosure.

Referring to FIG. 1, according to a communication method in an embodiment of the present disclosure, the method includes the following steps:

Step S10, a terminal determines a primary cell (PCell) group or a primary secondary cell (PSCell) group working on the unlicensed carrier, the PCell group or the PSCell group are established by selected from at least one serving cell working on the unlicensed carrier, each serving cell works on one unlicensed carrier.

Regarding how to configure the at least one serving cell and how to select and constitute the PCell group or the PSCell group of each terminal, the present disclosure provides following three schemes:

Scheme One:

The PSCell group is established by selecting from at least one serving cell by the primary serving cell of the primary base station working in licensed frequency band, the at least one serving cell is configured by the primary serving cell for the terminal on the secondary base station.

The scheme one is applicable to a communication scene that the unlicensed frequency band and the licensed frequency band are communicated in a DC mode, namely, the primary serving cell of the primary base station working in a licensed frequency band configures the at least one serving cell for each terminal on a secondary Evolved Node B (SeNB), and the primary serving cell selects and constitutes the PSCell group of each terminal on the SeNB.

Scheme Two:

The PSCell group is established by selecting from at least one serving cell by a primary secondary serving cell working in unlicensed frequency band, the primary secondary serving cell is configured by the primary serving cell of the primary base station working in a licensed frequency band for the terminal on the SeNB. The primary secondary serving cell configures zero or at least one cell working in the unlicensed frequency band for the terminal on the SeNB, the zero or at least one cell and the primary secondary serving cell constitute the at least one serving cell.

The scheme two is also applicable to a communication scene that the unlicensed frequency band and the licensed frequency band are communicated in the DC mode, namely, the primary serving cell of the primary base station working in an licensed frequency band configures the primary secondary serving cell for each terminal on the SeNB, and the primary secondary serving cell configures zero or at least one cell working in the unlicensed frequency band for each terminal on the SeNB, the zero or at least one cell and the primary secondary serving cell constitute the at least one serving cell, and the primary secondary serving cell selects and constitutes the PSCell group of each terminal on the SeNB.

Moreover, under the condition that there are a plurality of primary secondary serving cells, configuration signaling for configuring the zero or at least one cell for each terminal is sent by one or more of the primary secondary serving cells. The configuration signaling can be Radio Resource Control (RRC) signaling.

Scheme Three:

The PCell group is established by selecting from at least one serving cell by the primary serving cell of the primary base station working in a unlicensed frequency band, the primary serving cell configures zero or at least one cell working in the unlicensed frequency band for the terminal on the primary base station, the zero or at least one cell and the primary serving cell constitute the at least one serving cell.

The scheme three is applicable to a communication scene that the unlicensed frequency band works independently, and the PCell is deployed in the unlicensed frequency band, namely, the primary serving cell of the primary base station working in an unlicensed frequency band configures zero or at least one cell working in the unlicensed frequency band for each terminal on the primary base station, the zero or at least one cell and the primary serving cell constitute the at least one serving cell, and the primary serving cell selects and constitutes the PCell group of each terminal.

The communication method shown in FIG. 1 further includes:

Step S12, the terminal performs a Radio Link Monitoring (RLM) on the PCell group or the PSCell group.

In an embodiment of the present disclosure, step S12 specifically includes: when a cell in the PCell group or the PSCell group is performing a downlink transmission, determining a sampling value of an SINR of a cell performing the downlink transmission by taking 5 ms or 10 ms as a sampling period, the downlink transmission comprising sending a downlink reference signal and/or downlink data and/or downlink control signaling; and determining a radio link state of the PCell group or the PSCell group according to the sampling value of the SINR.

In this embodiment, the sampling value of the SINR is only performed within a duration of downlink transmission, optionally, in order to have more sampling values in a sliding window for SINR averaging, a smaller sampling period (e.g., 5 ms) can be used to sample.

According to the sampling value of the SINK, implementation of the step of determining the radio link state of the PCell group or the PSCell group, the present disclosure provides the following several modes:

Mode One:

Calculating an average value of the sampling values of the SINR obtained on all cells in the PCell group or the PSCell group within a sliding window time period of a predetermined length, and determining the radio link state of the PCell group or the PSCell group based on the average value of the maximum values.

In this mode, the sampling values of the SINR detected on all cells in the PCell group or the PSCell group can be averaged together, to determine the radio link state of the PCell group or the PSCell group.

Moreover, when it is determined that a radio link of the PSCell group fails, sending a radio link failure report to the primary serving cell of the primary base station working in the licensed frequency band; when it is determined that a radio link of the PCell group fails, performing an RRC-reestablishment process.

Mode Two:

At each sampling time, selecting a maximum value of the sampling values of the SINR detected by the PCell group or the PSCell group, calculating an average value of the maximum values within the sliding window time period, and determining the radio link state of the PCell group or the PSCell group based on the average value of the maximum values.

In this mode, at each sampling time, the maximum value of the sampling value of the SINR can reflect the radio link state of the PCell group or the PSCell group in the whole, thus the maximum value of the plurality of sampling values of SINR selected in the plurality of sampling time can be averaged, to determine the radio link state of the PCell group or the PSCell group.

Moreover, when it is determined that the radio link state of the PSCell group is determined to be failed, sending a radio link failure report to a primary serving cell of the primary base station working in the licensed frequency band; when it is determined that the radio link of the PCell group fails, performing an RRC-reestablishment process.

Mode Three:

Calculating an average value of the SINR sampling values of each cell in the PCell group or the PSCell group within the sliding window period of the predetermined length, to determine the radio link state of each cell respectively.

In this mode, the SINR sampling values for each cell may be averaged separately, to determine the radio link state of each cell respectively, and further determining a radio link state of a whole PCell group or PSCell group according to the radio link state of each cell.

In addition, in the step 12, performing the RLM on the PCell group or PSCell group can also have the following modes:

Mode Four:

Detecting a channel occupancy rate of each cell in the PCell group or PSCell group; and when the channel occupancy rate of any cell in the PCell group or PSCell group is greater than a set threshold value, determining that the radio link of the any cell failed.

In the mode four, the radio link state of each cell can be determined according to the channel occupancy rate of each cell, and further determining a radio link state of the whole PCell group or PSCell group according to the radio link state of each cell.

Mode Five:

Detecting Received Signal Strength Indication (RSSI) of each cell in the PCell group or the PSCell group; and when the RSSI of any cell in the PCell group or the PSCell group detected is higher than a threshold value within a continuous preset duration, determining that the radio link of the any cell failed, the threshold value beings used for determining whether the channel is idle.

In the mode five, the radio link state of each cell can be determined according to the RSSI of each cell, and further the radio link state of the whole PCell group or the PSCell group can be determined according to the radio link state of each cell.

Based on the technical solution of the mode three, the mode four and the mode five, the communication method further includes:

When the radio link states of all cells in the PSCell group are determined to be failed, sending a radio link failure report to the primary serving cell of the primary base station working in an licensed frequency band;

When the radio link state of any cell in the PSCell group is determined to be failed, sending a corresponding notification message to the primary serving cell of the primary base station working in an licensed frequency band or the other PSCells in the PSCell group; the other PSCells are remaining cells other than the any cell in the PSCell group;

When the radio link states of all cells in the PCell group are determined to be failed, performing an RRC-reestablishment process;

When the radio link state of any cell in the PCell group is determined to be failed, sending the corresponding notification message to the other PCells in the PCell group; the other Pcells are remaining cells other than the any cell in the PCell group.

In the communication method shown in FIG. 1, as a channel cannot be continuously occupied in the unlicensed frequency band, that is a channel detection mechanism is existed, therefore, a number of times of RLF can be reduced by performing the RLM on the PCell group or PSCell group, and then it can avoided a problem of huge signaling overhead and throughput loss, caused by RRC Reestablishment or reconfiguration of the PSCell as RLF has been frequently detected in the unlicensed frequency band.

The execution body of the communication method shown in FIG. 1 may be a terminal.

Figure 2:
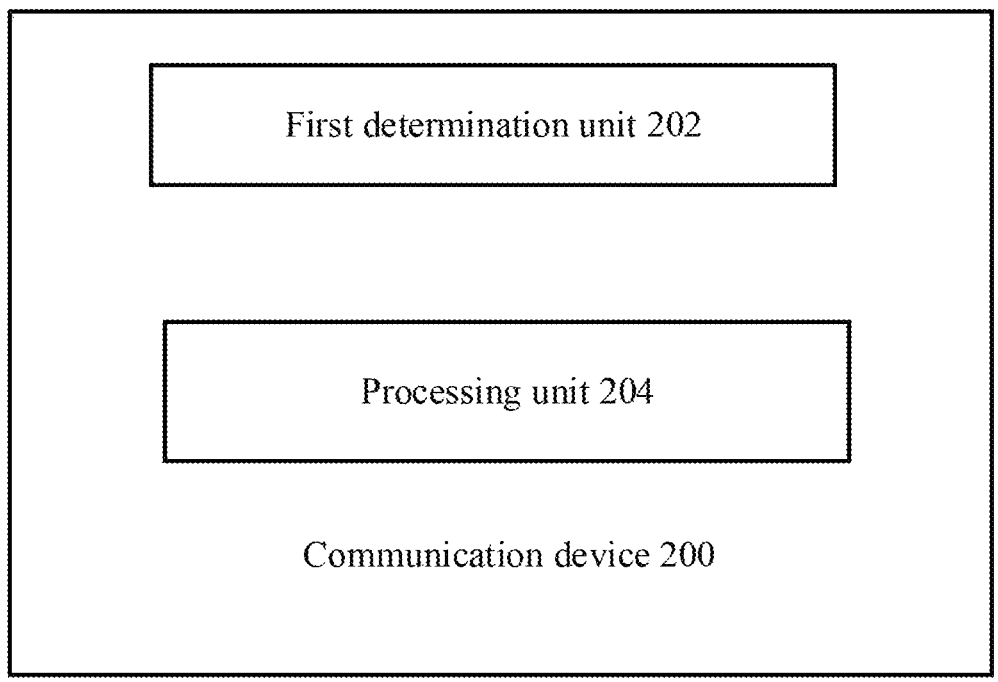
FIG. 2 is a schematic diagram of a communication device in accordance with a first embodiment of the present disclosure.

FIG. 2 is a schematic diagram of a communication device in accordance with a first embodiment of the present disclosure.

Referring to FIG. 2, according to communication device 200 in a first embodiment of the present disclosure, includes: a first determination unit 202 and a processing unit 204.

The first determination unit 202, configured to determine a PCell group or a PSCell group working on the unlicensed carrier, the PCell group or the PSCell group being established by selected from at least one serving cell working on the unlicensed carrier, each serving cell working on one unlicensed carrier, and the processing unit 204, configured to perform a RLM on the PCell group or the PSCell group.

In the technical solution, when at least one serving cells that are working in the unlicensed frequency band is selected to constitute the PCell, this is a communication scene that the PCell is deployed in the unlicensed frequency band and the PCell is working in the unlicensed frequency band independently. As a channel cannot be continuously occupied in the unlicensed frequency band, that is a channel detection mechanism is existed, therefore, a number of times of RLF can be reduced by performing the RLM on the PCell group, and then it can avoided a problem of huge signaling overhead and throughput loss, caused by RRC Reestablishment as RLF has been frequently detected in the unlicensed frequency band. The PCell group working on the unlicensed carrier can be determined by receiving notification signaling sent by a primary serving cell of a primary base station in an unlicensed frequency band.

when at least one serving cells that are working in the unlicensed frequency band is selected to constitute the PSCell, this is a communication scene that a Dual Connectivity (DC) is executed in an unlicensed frequency band and a licensed frequency band. As a channel cannot be continuously occupied in the unlicensed frequency band, that is a channel detection mechanism is existed, therefore, a number of times of RLF can be reduced by performing the RLM on the PSCell group, and then it can avoided a problem of huge signaling overhead and throughput loss, caused by reconfiguration of the PSCell as RLF has been frequently detected in the unlicensed frequency band.

Regarding how to configure the at least one serving cell and how to select and constitute the PCell group or the PSCell group of each terminal, the present disclosure provides following three schemes:

Scheme One:

The PSCell group is established by selecting from at least one serving cell by the primary serving cell of the primary base station working in licensed frequency band, the at least one serving cell is configured by the primary serving cell for the terminal on the secondary base station.

The scheme one is applicable to a communication scene that the unlicensed frequency band and the licensed frequency band are communicated in a DC mode, namely, the primary serving cell of the primary base station working in a licensed frequency band configures the at least one serving cell for each terminal on a secondary Evolved Node B (SeNB), and the primary serving cell selects and constitutes the PSCell group of each terminal on the SeNB.

Scheme Two:

The PSCell group is established by selecting from at least one serving cell by a primary secondary serving cell working in unlicensed frequency band, the primary secondary serving cell is configured by the primary serving cell of the primary base station working in a licensed frequency band for the terminal on the SeNB. The primary secondary serving cell configures zero or at least one cell working in the unlicensed frequency band for the terminal on the SeNB, the zero or at least one cell and the primary secondary serving cell constitute the at least one serving cell.

The scheme two is also applicable to a communication scene that the unlicensed frequency band and the licensed frequency band are communicated in the DC mode, namely, the primary serving cell of the primary base station working in an licensed frequency band configures the primary secondary serving cell for each terminal on the SeNB, and the primary secondary serving cell configures zero or at least one cell working in the unlicensed frequency band for each terminal on the SeNB, the zero or at least one cell and the primary secondary serving cell constitute the at least one serving cell, and the primary secondary serving cell selects and constitutes the PSCell group of each terminal on the SeNB.

Moreover, under the condition that there are a plurality of primary secondary serving cells, configuration signaling for configuring the zero or at least one cell for each terminal is sent by one or more of the primary secondary serving cells. The configuration signaling can be Radio Resource Control (RRC) signaling.

Scheme Three:

The PCell group is established by selecting from at least one serving cell by the primary serving cell of the primary base station working in a unlicensed frequency band, the primary serving cell configures zero or at least one cell working in the unlicensed frequency band for the terminal on the primary base station, the zero or at least one cell and the primary serving cell constitute the at least one serving cell.

The scheme three is applicable to a communication scene that the unlicensed frequency band works independently, and the PCell is deployed in the unlicensed frequency band, namely, the primary serving cell of the primary base station working in an unlicensed frequency band configures zero or at least one cell working in the unlicensed frequency band for each terminal on the primary base station, the zero or at least one cell and the primary serving cell constitute the at least one serving cell, and the primary serving cell selects and constitutes the PCell group of each terminal.

Figure 3:
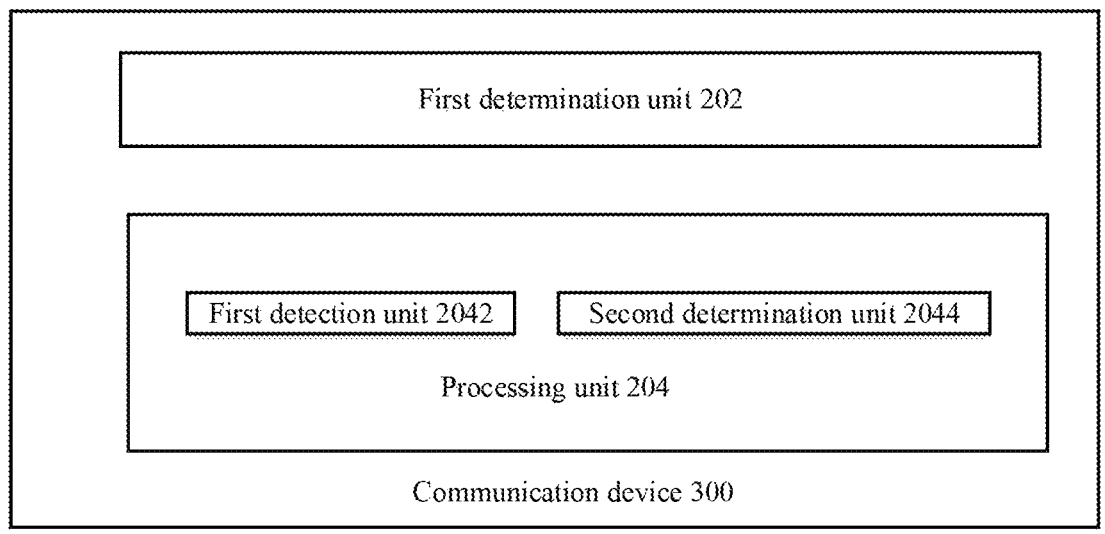
FIG. 3 is a schematic diagram of a communication device in accordance with a second embodiment of the present disclosure.

In one embodiment of the present disclosure, referring to FIG. 3, the processing unit 204 includes: a first detection unit 2042, configured to determine a sampling value of an SINR of a cell performing the downlink transmission by taking 5 ms or 10 ms as a sampling period, when a cell in the PCell group or the PSCell group is performing a downlink transmission, the downlink transmission comprising sending a downlink reference signal and/or downlink data and/or downlink control signaling; a second determination unit 2044, configured to determine a radio link state of the PCell group or the PSCell group according to the sampling value of the SINR.

In the technical solution, the sampling value of the SINR is only performed within a duration of downlink transmission, optionally, in order to have more sampling values in a sliding window for SINR averaging, a smaller sampling period (e.g., 5 ms) can be used to sample.

The mode that the second determination unit 2044 determines the radio link state of the PCell group or the PSCell group according to the sampling value of the SINR includes the following several modes:

Mode One:

The second determination unit 2044 is specially configured to:

Calculate an average value of the sampling values of the SINR obtained on all cells in the PCell group or the PSCell group within a sliding window time period of a predetermined length, and determine the radio link state of the PCell group or the PSCell group based on the average value of the maximum values.

In this mode, the sampling values of the SINR detected on all cells in the PCell group or the PSCell group can be averaged together, to determine the radio link state of the PCell group or the PSCell group.

Mode Two:

The second determination unit 2044 is specially configured to:

At each sampling time, select a maximum value of the sampling values of the SINR detected by the PCell group or the PSCell group, calculate an average value of the maximum values within the sliding window time period, and determine the radio link state of the PCell group or the PSCell group based on the average value of the maximum values.

In this mode, at each sampling time, the maximum value of the sampling value of the SINR can reflect the radio link state of the PCell group or the PSCell group in the whole, thus the maximum value of the plurality of sampling values of SINR selected in the plurality of sampling time can be averaged, to determine the radio link state of the PCell group or the PSCell group.

Figure 4:
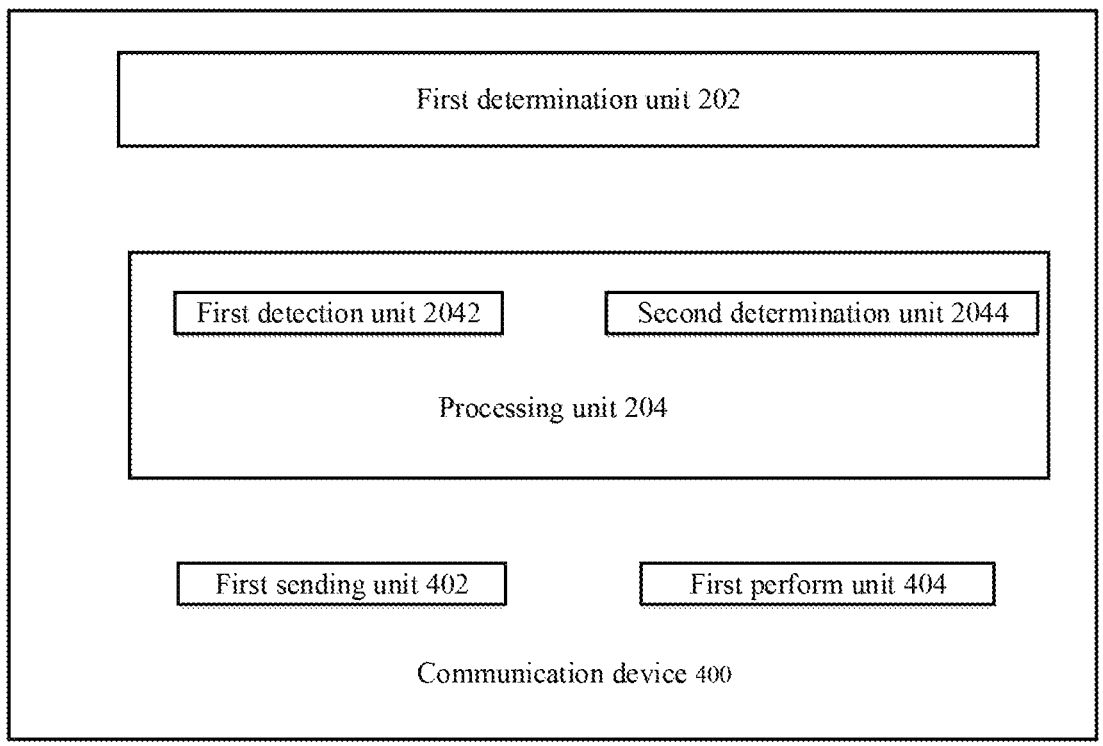
FIG. 4 is a schematic diagram of a communication device in accordance with a third embodiment of the present disclosure.

Based on technical solution of mode one and mode two, referring to FIG. 4, communication device 400 in accordance with the third embodiment of the present disclosure further includes: a first sending unit 402 and a first perform unit 404.

The first sending unit 402, configured to send a radio link failure report to a primary serving cell of the primary base station working in the licensed frequency band, when the second determination unit determines that the radio link state of the PSCell group is determined to be failed; the first perform unit 404, configured to perform an RRC-reestablishment process, when the second determination unit determines that the radio link state of the PSCell group is determined to be failed.

Mode Three:

The second determination unit 2044 is specially configured to:

Calculate an average value of the SINR sampling values of each cell in the PCell group or the PSCell group within the sliding window period of the predetermined length, to determine the radio link state of each cell respectively.

In this mode, the SINR sampling values for each cell may be averaged separately, to determine the radio link state of each cell respectively, and further determining a radio link state of a whole PCell group or PSCell group according to the radio link state of each cell.

Figure 5:
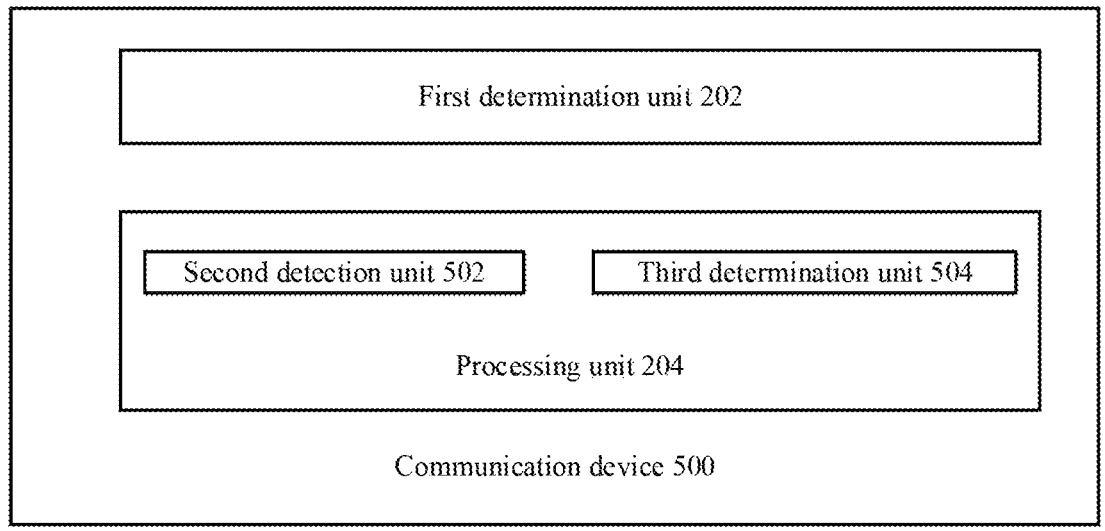
FIG. 5 is a schematic diagram of a communication device in accordance with a fourth embodiment of the present disclosure.

In addition, the processing unit 204 performing the RLM on the PCell group or PSCell group can also have the following modes:

Mode Four:

Referring to FIG. 5, the processing unit 204 includes: a second detection unit 502 and a third determination unit 504.

The second detection unit 502, configured to detect a channel occupancy rate of each cell in the PCell group or PSCell group; the third determination unit 504, configured to determine that the radio link of the any cell failed, when the second detection unit detects that the channel occupancy rate of any cell in the PCell group or PSCell group is greater than a set threshold value.

In the mode four, the radio link state of each cell can be determined according to the channel occupancy rate of each cell, and further determining a radio link state of the whole PCell group or PSCell group according to the radio link state of each cell.

Figure 6:
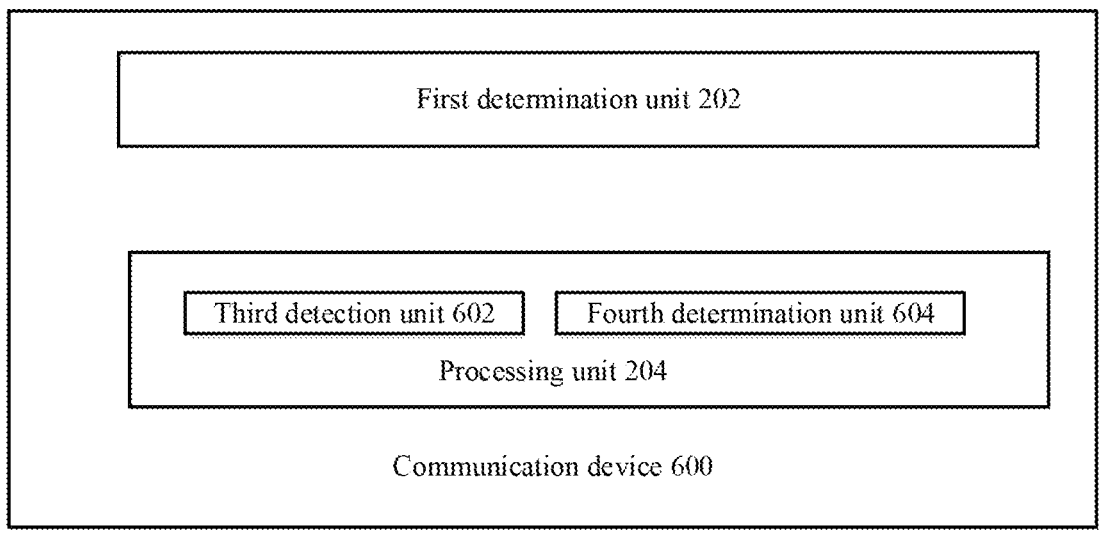
FIG. 6 is a schematic diagram of a communication device in accordance with a fifth embodiment of the present disclosure.

Mode Five:

Referring to FIG. 6, the processing unit 204 includes: a third detection unit 602 and a third determination unit 604.

The third detection unit 602, configured to detect Received Signal Strength Indication (RSSI) of each cell in the PCell group or the PSCell group; a fourth determination unit 604, configured to determine that the radio link of the any cell failed, when the third detection unit detects that the RSSI of any cell in the PCell group or the PSCell group is higher than a threshold value within a continuous preset duration, the threshold value beings used for determining whether the channel is idle.

In the mode five, the radio link state of each cell can be determined according to the RSSI of each cell, and further the radio link state of the whole PCell group or the PSCell group can be determined according to the radio link state of each cell.

In one embodiment of the disclosure, based on the technical solution of the mode three, the mode four and the mode five, the communication device further includes the following units (not shown):

A second sending unit, configured to send a radio link failure report to the primary serving cell of the primary base station working in an licensed frequency band, when the radio link states of all cells in the PSCell group are determined to be failed, and configured to send a corresponding notification message to the primary serving cell of the primary base station working in an licensed frequency band or the other PSCells in the PSCell group, when the radio link state of any cell in the PSCell group is determined to be failed;

A second perform unit, configured to perform an RRC-reestablishment process, when the radio link states of all cells in the PCell group are determined to be failed;

A third sending unit, configured to send the corresponding notification message to the other PCells in the PCell group, when the radio link state of any cell in the PCell group is determined to be failed.

The present disclosure also provides a terminal, including: the communication device as shown in any of FIGS. 2 to 6.

In summary, the technical solution of the present disclosure mainly ensures normal communication by the PCell Group or the PSCell Group working in an unlicensed frequency band, and based on this, the technical solution of the present disclosure provides a new RLM mechanism, which can perform RLM on the PCell group or the PSCell group, a number of times of RLF is reduced, and it can avoided a problem of huge signaling overhead and throughput loss, caused by RRC Reestablishment or reconfiguration of the PSCell as RLF has been frequently detected in the unlicensed frequency band.

Specifically, it is mainly divided into the following aspects:

First, configuration of a PCell Group or a PSCell Group.

1, the CONFIGURATION of the PCell Group.

The PCell of the primary base station working in the unlicensed frequency band configures zero or at least one Cell working in the unlicensed frequency band for each terminal on the primary base station, and the PCell selects zero or at least one from the zero or at least one Cell, and constitutes the PCell Group of each terminal with the PCell together.

Each of the at least one Cell works on an unlicensed carrier, for example, Cell #1 is configured on the unlicensed carrier 1, Cell #2 is configured on the unlicensed carrier 2, and Cell #3 is configured on the unlicensed carrier 3 . . . Cell #M is configured on the unlicensed carrier M, and then the PCell selects zero or at least one Cell, the zero or at least one Cell and the PCell constitute a PCell Group for each terminal. The number of cells in the PCell Group can have an upper limit value, such as a maximum value is 2, 3, or other values. For different users, the PCell Group is independent, that is, the PCell Group of different users can be the same or different.

2, the configuration of the PSCell group specifically has two configuration schemes:

Scheme One:

The PCell of the primary base station (e.g., Macro/Master Evolved Node B (MeNB)) working in the licensed frequency band configures at least one serving cell working in the unlicensed frequency band for each terminal on the secondary base station (e.g., secondary Evolved Node B (SeNB)), and then the PCell selects at least one PSCell as each terminal on the SeNB from the at least one serving cell, to constitute a PSCell Group of each terminal on the secondary base station.

Each serving cell in at least one serving cell works on an unlicensed carrier, for example, SCell #1 is configured on the unlicensed carrier 1, Scell #2 is configured on the unlicensed carrier 2, SCell #3 is configured on the unlicensed carrier 3 . . . Scell #M is configured on the unlicensed carrier M, and then the PCell selects at least one SCell to constitute the PSCell Group of each terminal. The number of cells in the PSCell Group can have an upper limit value, such as a maximum value is 2, 3, or other values. For different users, the PSCell Group is independent, that is, the PSCell Group of different users can be the same or different.

Scheme Two:

The PCell of the primary base station (e.g., MeNB) working in the licensed frequency band configures at least one PSCell working in the unlicensed frequency band for each terminal on the secondary base station (e.g., the SeNB), the PSCell configures zero or at least one cell working in the unlicensed frequency band for each terminal on the SeNB, the PSCell selects zero or at least one from the zero or at least one cell, and constitute the PSCell Group of each terminal with PSCell together.

Each of the at least one cell works on an unlicensed carrier, for example, SCell #1 is configured on the unlicensed carrier 1, SCell #2 is configured on the unlicensed carrier 2, and SCell #3 is configured on the unlicensed carrier 3 . . . SCell #M is configured on the unlicensed carrier M, and then the PSCell selects zero or at least one SCell, the zero or at least one SCell and PSCell constitute a PSCell Group for each terminal. The number of cells in the PSCell Group can have an upper limit value, such as a maximum value is 2, 3, or other values. For different users, the PSCell Group is independent, that is, the PSCell Group of different users can be the same or different.

3, a specific method for selecting PSCell in a PSCell Group includes:

At first, the SCell is selected to constitute the SCell Group, and one or more of the SCells are further selected from the SCell Group, to constitute the PSCell Group.

When the SCell is selected, it can be selected by adopting Event A3, Event A4, or Event A5 of LTE.

For example, when the Event A3 is adopted, when the service quality of the neighboring cell is higher than service quality of the current serving cell, the neighboring cell is added into the SCell Group. When the Event A4 is adopted, when the service quality of the neighboring cell is higher than a threshold value, the neighboring cell is added into the SCell Group. When the Event A5 is adopted, when the service quality of the serving cell is lower than a threshold value and a service quality of the neighboring cell is higher than a threshold value, the neighboring cell is added into the SCell Group.

4, addition, removal, and replacement of the PSCells in the PSCell Group:

(1) Addition of the PSCell.

All SCells are sorted in a descending order according to a sorting criteria, which indicates that: RSRP/RSRQ is in a sequence from large to small and/or channel occupancy rates are in a sequence from low to high. The SCells that are arranged in the front and satisfy the predetermined condition are sequentially selected to be PSCell #1, PSCell #2 . . . until a number of the selected PSCells reaches a maximum number or all SCells have been selected. The predetermined condition refers to that the RSRP/RSRQ is larger than a threshold value, and/or the channel occupancy is less than a threshold value.

(2) Removal of PSCells.

When RSRP/RSRQ of a certain PSCell in the PSCell Group is less than one certain threshold value, and/or when a channel occupancy is larger than a threshold value, the PSCell is removed from the PSCell Group.

(3) Replacement of PSCells.

Manner one: when RSRP/RSRQ of a certain SCell is higher than RSRP/RSRQ of a PSCell in the PSCell Group and exceeds one certain value, and/or when a channel occupancy rate of a certain SCell is lower than a channel occupancy rate of a PSCell and less than one certain value, the PSCell is then replaced by the SCell.

Manner 2: when RSRP/RSRQ of a certain SCell is higher than a threshold value 1, and/or a channel occupancy rate of the certain S Cell is lower than a threshold value 2; and RSRP/RSRQ of a PSCell in the PSCell Group is lower than a threshold value 3, and/or a channel occupancy rate of the PSCell is higher than a threshold value 4, the PSCell is replaced by the SCell.

5, Addition, removal, and replacement schemes of PCells in a PCell Group are similar to the addition, removal, and replacement schemes of the PSCells in the PSCell Group, and it is not described again.

Second, Performing a radio link monitoring on the PCell Group or the PSCell Group.

1, The sampling value of the SINR can only be sampled during the transmission time of the Discovery Reference Signal (DRS) and/or the Cell Specific Reference Signal (CRS) and/or the Channel State Indication Reference Signal (CSI-RS) and/or Primary Synchronization Signal/Secondary Synchronization Signal (PSS/SSS) and/or Physical Downlink Control Channel (PDCCH)/Physical Downlink Shared Channel (PDSCH), and is not sampled when no DRS/CRS/CSI-RS/PSS/SSS and/or PDCCH/PDSCH is transmitted, thus when sampling using 10 ms as a period, it may cause no sampled value in some 10 ms. To solve this problem, the SINR sampling period can be shortened, for example, 5 ms.

2, The average modes of three kinds of SINR sample values:

Mode One:

Calculating an average value of the sampling values of the SINR obtained on all cells in the PCell group or the PSCell group within a sliding window time period of a predetermined length, and determining the radio link state of the PCell group or the PSCell group based on the average value of the maximum values.

In this mode, the sampling values of the SINR detected on all cells in the PCell group or the PSCell group can be averaged together, to determine the radio link state of the PCell group or the PSCell group.

Mode Two:

At each sampling time, selecting a maximum value of the sampling values of the SINR detected by the PCell group or the PSCell group, calculating an average value of the maximum values within the sliding window time period, and determining the radio link state of the PCell group or the PSCell group based on the average value of the maximum values.

In this mode, at each sampling time, the maximum value of the sampling value of the SINR can reflect the radio link state of the PCell group or the PSCell group in the whole, thus the maximum value of the plurality of sampling values of SINR selected in the plurality of sampling time can be averaged, to determine the radio link state of the PCell group or the PSCell group.

Mode Three:

Calculating an average value of the SINR sampling values of each cell in the PCell group or the PSCell group within the sliding window period of the predetermined length, to determine the radio link state of each cell respectively.

In this mode, the SINR sampling values for each cell in the PCell group or PSCell group may be averaged separately, to determine the radio link state of each cell respectively, and further determining a radio link state of a whole PCell group or PSCell group according to the radio link state of each cell.

3, The user equipment can sample the RSSI of each PSCell, and then calculate the channel occupancy rate of each PSCell. When the channel occupancy rate is higher than a threshold, it is indicated the PSCell RLF.

Similarly, the user equipment can sample the RSSI of each PCell, and then calculate the channel occupancy rate of each PCell. When the channel occupancy rate is higher than a threshold, it indicates the PCell RLF.

The channel occupancy rate=a number of times that the RSSI is higher than the LBT channel detection threshold/a total number of times of the RSSI sampling.

4, The user equipment can sample the RSSI of each PSCell, when the RSSI is sampled in consecutive time T is higher than a threshold that detects whether the channel is idle, it is indicated the PSCell RLF.

Similarly, The user equipment can sample the RSSI of each PSCell, when the RSSI is sampled in consecutive time T is higher than a threshold that detects whether the channel is idle, it is indicated the PCell RLF.

5, When all the PSCells in the PSCell Group are RLF, the PSCell RLF of the user equipment is calculated, which in turn triggers the user equipment to send a radio link failure report to the PCell of the primary base station in the licensed frequency band; and when a PSCell in the PSCell Group is RLF, the user equipment may send a notification message to the PCell of the primary base station in the licensed frequency band or the other PSCells in the PSCell Group, to trigger the removal of the PSCell, that is, the PSCell is removed from the PSCell Group.

6, When all the PCells in the PCell Group are RLF, the PCell RLF of the user equipment is calculated, which in turn triggers the user equipment to perform RRC-reestablishment process, when a PCell in the PCell Group is RLF, the user equipment may send a notification message to the PCell of the primary base station in the unlicensed frequency band, to trigger the removal of the PCell, that is, the PCell is removed from the PCell Group.

Figure 7:
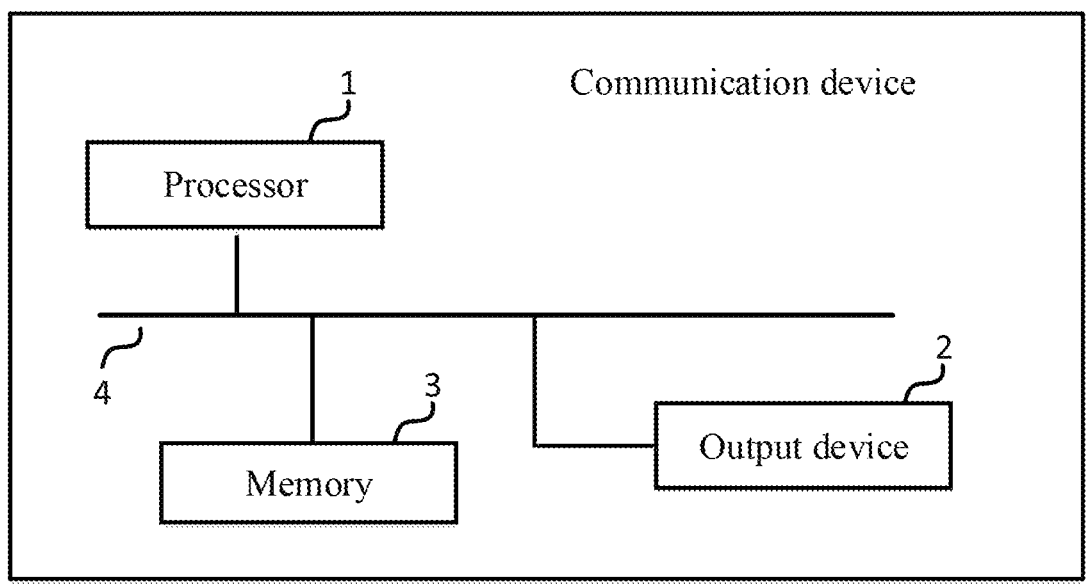
FIG. 7 is a schematic diagram of a communication device in accordance with a sixth embodiment of the present disclosure.

FIG. 7 is a schematic diagram of a communication device in accordance with a sixth embodiment of the present disclosure.

As shown in FIG. 7, a communication device according to the sixth embodiment of the present disclosure, includes: a processor 1, an output device 2 and a memory 3. In some embodiments of the present disclosure, the processor 1, the output device 2 and the memory 3 may be connected through a bus 4 or the like, and an example of the connection through the bus 4 is shown in FIG. 7.

The memory 3 is used to store a set of program codes, and the processor 1 invokes the program codes stored in the memory 3, to perform the following operations:

determining a PCell group or a PSCell group working on the unlicensed carrier, the PCell group or the PSCell group being established by selected from at least one serving cell working on the unlicensed carrier, each serving cell working on one unlicensed carrier;

Performing a RLM on the PCell group or the PSCell group.

As an optional implementation manner, the processor 1 invokes the program codes stored in the memory 3, specifically for performing the following operations:

When a cell in the PCell group or the PSCell group is performing a downlink transmission, determining a sampling value of an SINR of a cell performing the downlink transmission by taking 5 ms or 10 ms as a sampling period, the downlink transmission comprising sending a downlink reference signal and/or downlink data and/or downlink control signaling;

Determining a radio link state of the PCell group or the PSCell group according to the sampling value of the SINK.

As an optional implementation manner, the processor 1 calls the program code stored in the memory 3, performing an operation of determining a radio link status of the cell group PCell group or the PSCell group, specifically:

Calculating an average value of the sampling values of the SINR obtained on all cells in the PCell group or the PSCell group within a sliding window time period of a predetermined length, and determining the radio link state of the PCell group or the PSCell group based on the average value of the maximum values; or At each sampling time, selecting a maximum value of the sampling values of the SINR detected by the PCell group or the PSCell group, calculating an average value of the maximum values within the sliding window time period, and determining the radio link state of the PCell group or the PSCell group based on the average value of the maximum values.

As an optional implementation manner, the processor 1 invokes the program codes stored in the memory 3, to perform the following operations:

When it is determined that the radio link state of the PSCell group is determined to be failed, sending a radio link failure report to a primary serving cell of the primary base station working in the licensed frequency band through output device 2;

When it is determined that the radio link of the PCell group fails, performing an RRC-reestablishment process.

As an optional implementation manner, the processor 1 calls the program code stored in the memory 3 to perform an operation of determining a radio link status of the cell group PCell group or the PSCell group, specifically:

Calculating an average value of the SINR sampling values of each cell in the PCell group or the PSCell group within the sliding window period of the predetermined length, to determine the radio link state of each cell respectively.

As an optional implementation manner, the processor 1 calls the program code stored in the memory 3 to perform an operation of determining a radio link status of the cell group PCell group or the PSCell group, specifically:

Detecting a channel occupancy rate of each cell in the PCell group or PSCell group;

When the channel occupancy rate of any cell in the PCell group or PSCell group is greater than a set threshold value, determining that the radio link of the any cell failed.

As an optional implementation manner, the processor 1 calls the program code stored in the memory 3 to perform an operation of determining a radio link status of the cell group PCell group or the PSCell group, specifically:

Detecting RSSI of each cell in the PCell group or the PSCell group;

When the RSSI of any cell in the PCell group or the PSCell group detected is higher than a threshold value within a continuous preset duration, determining that the radio link of the any cell failed, the threshold value beings used for determining whether the channel is idle.

As an optional implementation manner, the processor 1 invokes the program codes stored in the memory 3, to perform the following operations:

When the radio link states of all cells in the PSCell group are determined to be failed, sending a radio link failure report to the primary serving cell of the primary base station working in an licensed frequency band through the output device 2;

When detecting that a radio link of any cell in the PSCell group fails, sending a corresponding notification message to the primary serving cell of the primary base station working in an licensed frequency band or the other PSCells in the PSCell group through the output device 2;

When the radio link states of all cells in the PCell group are determined to be failed, performing an RRC-reestablishment process;

When detecting that the radio link of the any cell in the PCell group fails, sending the corresponding notification message to the other PCells in the PCell group the output device 2.

The steps in the method of the embodiment of the present disclosure may be sequentially adjusted, merged, and deleted according to actual requirements.

The units in the communication device of the embodiment of the present disclosure may be combined, divided, and deleted according to actual requirements.

Those skilled in the art can understand that all or part of the various methods of the above embodiments can be completed by a program instructing related hardware, and the program can be stored in a computer readable storage medium, the storage medium includes Read-Only Memory (ROM), Random Access Memory (RAM), Programmable Read-Only Memory (PROM), Erasable Programmable Read Only Memory (EPROM), One-Time Programmable Read-Only Memory (OTPROM), Electronically-Erasable Programmable Read-Only Memory (EEPROM), Compact Disc Read-Only Memory CD-ROM (CD-ROM) or other optical disc storage, disk storage, magnetic tape storage, or any other medium readable by a computer that can be used to carry or store data.

The technical solution of the present disclosure is described in detail above with reference to the accompanying drawings. The present disclosure provides a new communication solution, which can deploy the PCell group or the PSCell group in the unlicensed frequency band, to perform RLM on the PCell group or the PSCell group, a number of times of RLF is reduced, and it can avoid a problem of huge signaling overhead and throughput loss, caused by RRC Reestablishment or reconfiguration of the PSCell as RLF has been frequently detected in the unlicensed frequency band.

The above description is only the preferred embodiment of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A terminal, comprising:
a processor; and
a memory storing a plurality of instructions, which when executed by the processor, causes the processor to:
determine a primary cell (PCell) group or a primary secondary cell (PSCell) group working on an unlicensed carrier, the PCell group or the PSCell group being established by selected from at least one serving cell working on the unlicensed carrier, each serving cell working on one unlicensed carrier; and
perform a Radio Link Monitoring (RLM) on the PCell group or the PSCell group, comprising:
determining a sampling value of an Signal to Interference plus Noise Ratio (SINR) of a cell performing a downlink transmission by taking 5 ms or 10 ms as a sampling time period, when a cell in the PCell group or the PSCell group is performing the downlink transmission, the downlink transmission comprising sending a downlink reference signal and/or downlink data and/or downlink control signaling;
determining a radio link state of the PCell group or the PSCell group according to the sampling value of the SINR according to any one of two methods, wherein a first method comprises:
calculating an average value of the sampling values of the SINR obtained on all cells in the PCell group or the PSCell group within a sliding window time period of a predetermined length, and determining the radio link state of the PCell group or the PSCell group based on the average value; or at each sampling time, selecting a maximum value from the sampling values of the SINR obtained by the PCell group or the PSCell group, calculating an average value of the maximum values within the sliding window time period, and determining the radio link state of the PCell group or the PSCell group based on the average value of the maximum values; or
wherein a second method comprises:
calculating an average value of the SINK sampling values of each cell in the PCell group or the PSCell group within the sliding window period of the predetermined length, and determining the radio link state of the cell in the PCell group or the PSCell group.

2. The terminal of claim 1, wherein:
the PSCell group is established by selecting from at least one serving cell by the primary serving cell of a primary base station working in licensed frequency band, the at least one serving cell being configured by the primary serving cell for the terminal on a secondary base station; or the PSCell group is established by selecting from at least one serving cell by a primary secondary serving cell working in unlicensed frequency band, the primary secondary serving cell being configured by the primary serving cell of the primary base station working in a licensed frequency band for the terminal on a secondary Evolved Node B (SeNB), wherein the primary secondary serving cell configures at least one cell working in the unlicensed frequency band for the terminal on the SeNB, the at least one cell and the primary secondary serving cell constitute the at least one serving cell; or the PCell group is established by selecting from at least one serving cell by the primary serving cell of the primary base station working in an unlicensed frequency band, wherein the primary serving cell configures at least one cell working in the unlicensed frequency band for the terminal on the primary base station, the at least one cell and the primary serving cell constitute the at least one serving cell.

3. The terminal of claim 1, the processor further:
sends a radio link failure report to a primary serving cell of the primary base station working in the licensed frequency band, when the radio link state of the PSCell group is determined to be failed;
performs an Radio Resource Control (RRC) reestablishment process, when the radio link state of the PCell group is determined to be failed.

4. The terminal of claim 1, wherein the processor further:
detects a channel occupancy rate of each cell in the PCell group or the PSCell group;
determines that the radio link of any cell failed when the channel occupancy rate of the any cell in the PCell group or the PSCell group is greater than a set threshold value.

5. The terminal of claim 1, wherein the processor further:
detects Received Signal Strength Indication (RSSI) of each cell in the PCell group or the PSCell group;
determines that the radio link of the any cell failed when the RSSI of any cell in the PCell group or the PSCell group is higher than a threshold value within a continuous preset duration, the threshold value beings used for determining whether the channel is idle.

6. The terminal of claim 1 the processor further:
sends a radio link failure report to the primary serving cell of the primary base station working on an licensed frequency band, when the radio link states of all cells in the PSCell group are determined to be failed, and sends a corresponding notification message to the primary serving cell of the primary base station working on the licensed frequency band or to the other PSCells in the PSCell group when the radio link state of any cell in the PSCell group is determined to be failed;
performs an RRC-reestablishment process when the radio link states of all cells in the PCell group are determined to be failed;
sends the corresponding notification message to the other PCells in the PCell group when the radio link state of any cell in the PCell group is determined to be failed.

7. A communication method, comprising:
determining a primary cell (PCell) group or a primary secondary cell (PSCell) group working on an unlicensed carrier by a terminal;
performing a Radio Link Monitoring (RLM) on the PCell group or the PSCell group, comprising:
determining a sampling value of an Signal to Interference plus Noise Ratio (SINR) of a cell performing a downlink transmission by taking 5 ms or 10 ms as a sampling time period, when a cell in the PCell group or the PSCell group is performing the downlink transmission, the downlink transmission comprising sending a downlink reference signal and/or downlink data and/or downlink control signaling;
determining a radio link state of the PCell group or the PSCell group according to the sampling value of the SINR according to any one of two methods, wherein a first method comprises:
calculating an average value of the sampling values of the SINR obtained on all cells in the PCell group or the PSCell group within a sliding window time period of a predetermined length, and determining the radio link state of the PCell group or the PSCell group based on the average value; or at each sampling time, selecting a maximum value from the sampling values of the SINR obtained by the PCell group or the PSCell group, calculating an average value of the maximum values within the sliding window time period, and determining the radio link state of the PCell group or the PSCell group based on the average value of the maximum values; or
wherein a second method comprises:
calculating an average value of the SINR sampling values of each cell in the PCell group or the PSCell group within the sliding window period of the predetermined length, and determining the radio link state of the cell in the PCell group or the PSCell group;
the PCell group or the PSCell group being established by selected from at least one serving cell working on the unlicensed carrier, each serving cell working on one unlicensed carrier.

8. The communication method of claim 7, wherein:
the PSCell group is established by selecting from at least one serving cell by the primary serving cell of a primary base station working in licensed frequency band, the at least one serving cell is configured by the primary serving cell for the terminal on a secondary base station; or
the PSCell group is established by selecting from at least one serving cell by a primary secondary serving cell working in unlicensed frequency band, the primary secondary serving cell being configured by the primary serving cell of the primary base station working in a licensed frequency band for the terminal on a secondary Evolved Node B (SeNB), wherein the primary secondary serving cell configures at least one cell working in the unlicensed frequency band for the terminal on the SeNB, the at least one cell and the primary secondary serving cell constitute the at least one serving cell; or
the PCell group is established by selecting from at least one serving cell by the primary serving cell of the primary base station working in an unlicensed frequency band, wherein the primary serving cell configures at least one cell working in the unlicensed frequency band for the terminal on the primary base station, the at least one cell and the primary serving cell constitute the at least one serving cell.

9. The communication method of claim 7, further comprising:
when it is determined that the radio link state of the PSCell group is determined to be failed, sending a radio link failure report to a primary serving cell of the primary base station working in the licensed frequency band;

when it is determined that the radio link state of the PSCell group is determined to be failed, performing an Radio Resource Control (RRC) reestablishment process.

10. The communication method of claim 7, wherein performing the RLM on the PCell group or the PSCell group comprises:

detecting a channel occupancy rate of each cell in the PCell group or the PSCell group; and when the channel occupancy rate of any cell in the PCell group or the PSCell group is greater than a set threshold value, determining that the radio link of the any cell failed; or detecting Received Signal Strength Indication (RSSI) of each cell in the PCell group or the PSCell group; and when the RSSI of any cell in the PCell group or the PSCell group detected is higher than a threshold value within a continuous preset duration, determining that the radio link of the any cell failed, the threshold value beings used for determining whether the channel is idle.

11. The communication method of claim 7, further comprising:

when the radio link states of all cells in the PSCell group are determined to be failed, sending a radio link failure report to the primary serving cell of the primary base station working on an licensed frequency band;

when the radio link state of any cell in the PSCell group is determined to be failed, sending a corresponding notification message to the primary serving cell of the primary base station working on a licensed frequency band or to the other PSCells in the PSCell group;

when the radio link states of all cells in the PCell group are determined to be failed, performing an RRC-reestablishment process;

when the radio link state of any cell in the PCell group is determined to be failed, sending the corresponding notification message to the other PCells in the PCell group.

12. A non-transitory storage medium having stored thereon instructions that, when executed by a processor of a terminal, causes the processor of the terminal to perform a communication method, the communication method comprising:

determining a primary cell (PCell) group or a primary secondary cell (PSCell) group working on an unlicensed carrier by a terminal;

performing a Radio Link Monitoring (RLM) on the PCell group or the PSCell group, comprising:

determining a sampling value of an Signal to Interference plus Noise Ratio (SINR) of a cell performing a downlink transmission by taking 5 ms or 10 ms as a sampling time period, when a cell in the PCell group or the PSCell group is performing the downlink transmission, the downlink transmission comprising sending a downlink reference signal and/or downlink data and/or downlink control signaling;

determining a radio link state of the PCell group or the PSCell group according to the sampling value of the SINR according to any one of two methods, wherein a first method comprises:

calculating an average value of the sampling values of the SINR obtained on all cells in the PCell group or the PSCell group within a sliding window time period of a predetermined length, and determining the radio link state of the PCell group or the PSCell group based on the average value; or at each sampling time, selecting a maximum value from the sampling values of the SINR obtained by the PCell group or the PSCell group, calculating an average value of the maximum values within the sliding window time period, and determining the radio link state of the PCell group or the PSCell group based on the average value of the maximum values; or wherein a second method comprises:

calculating an average value of the SINR sampling values of each cell in the PCell group or the PSCell group within the sliding window period of the predetermined length, and determining the radio link state of the cell in the PCell group or the PSCell group;

the PCell group or the PSCell group being established by selected from at least one serving cell working on the unlicensed carrier, each serving cell working on one unlicensed carrier.

13. The non-transitory storage medium according to claim 12, wherein:

the PSCell group is established by selecting from at least one serving cell by the primary serving cell of a primary base station working in licensed frequency band, the at least one serving cell being configured by the primary serving cell for the terminal on a secondary base station; or the PSCell group is established by selecting from at least one serving cell by a primary secondary serving cell working in unlicensed frequency band, the primary secondary serving cell is configured by the primary serving cell of the primary base station working in a licensed frequency band for the terminal on a secondary Evolved Node B (SeNB), wherein the primary secondary serving cell configures at least one cell working in the unlicensed frequency band for the terminal on the SeNB, the at least one cell and the primary secondary serving cell constitute the at least one serving cell; or the PCell group is established by selecting from at least one serving cell by the primary serving cell of the primary base station working in an unlicensed frequency band, wherein the primary serving cell configures at least one cell working in the unlicensed frequency band for the terminal on the primary base station, the-at least one cell and the primary serving cell constitute the at least one serving cell.

14. The non-transitory storage medium according to claim 12, wherein the communication method further comprises:

when it is determined that the radio link state of the PSCell group is determined to be failed, sending a radio link failure report to a primary serving cell of the primary base station working in the licensed frequency band;

when it is determined that the radio link state of the PSCell group is determined to be failed, performing an Radio Resource Control (RRC) reestablishment process.

15. The non-transitory storage medium according to claim 12, wherein performing the RLM on the PCell group or the PSCell group comprises:

detecting a channel occupancy rate of each cell in the PCell group or the PSCell group; and when the channel occupancy rate of any cell in the PCell group or the PSCell group is greater than a set threshold value, determining that the radio link of the any cell failed; or detecting Received Signal Strength Indication (RSSI) of each cell in the PCell group or the PSCell group; and when the RSSI of any cell in the PCell group or the PSCell group detected is higher than a threshold value within a continuous preset duration, determining that the radio link of the any cell failed, the threshold value beings used for determining whether the channel is idle.

16. The non-transitory storage medium according to claim 12, wherein the communication method further comprises:

when the radio link states of all cells in the PSCell group are determined to be failed, sending a radio link failure report to the primary serving cell of the primary base station working on an licensed frequency band;

when the radio link state of any cell in the PSCell group is determined to be failed, sending a corresponding notification message to the primary serving cell of the primary base station working on a licensed frequency band or to the other PSCells in the PSCell group;

when the radio link states of all cells in the PCell group are determined to be failed, performing an RRC-reestablishment process;

when the radio link state of any cell in the PCell group is determined to be failed, sending the corresponding notification message to the other PCells in the PCell group.

* * * * *

UNITED STATES PATENT AND TRADEMARK OFFICE
CERTIFICATE OF CORRECTION

Page 1 of 1

PATENT NO. : 10,785,665 B2
APPLICATION NO. : 16/331614
DATED : September 22, 2020
INVENTOR(S) : Ming-Ju Li, Ya-Jun Zhu and Yun-Fei Zhang It is certified that error appears in the above-identified patent and that said Letters Patent is hereby corrected as shown below:

On the Title Page

Please replace item (73) regarding "Assignees" with the following:
(73) YULONG COMPUTER TELECOMMUNICATION SCIENTIFIC (SHENZHEN) CO., LTD., Shenzhen (CN)

Signed and Sealed this
Twelfth Day of January, 2021

Andrei Iancu
*Director of the United States Patent and Trademark Office*